United States Patent [19]

Lin

[11] Patent Number: 5,350,805

[45] Date of Patent: Sep. 27, 1994

[54] EPOXIDE-DIRECT GRAFTED HALOGENATED VINYL POLYMERS

[75] Inventor: Juchui R. Lin, Bedford, Mass.

[73] Assignee: Koch Membrane Systems, Inc., Wilmington, Mass.

[21] Appl. No.: 75,229

[22] Filed: Jun. 10, 1993

[51] Int. Cl.$^5$ ............................................. C08G 59/14
[52] U.S. Cl. .................................. 525/121; 525/326.2; 525/331.5
[58] Field of Search .................... 525/121, 326.2, 331.5

[56] References Cited

U.S. PATENT DOCUMENTS

| | | | |
|---|---|---|---|
| 3,288,884 | 11/1966 | Sonnabend et al. | 525/121 |
| 3,321,550 | 5/1967 | Hardman et al. | 525/121 |
| 3,579,608 | 5/1971 | De Coste | 525/121 |
| 3,779,982 | 12/1973 | Camp et al. | 525/121 |
| 3,784,506 | 1/1974 | Vasta | 260/39 R |

FOREIGN PATENT DOCUMENTS

| | | | |
|---|---|---|---|
| 2396785 | 2/1979 | France | 525/121 |
| 52-29847 | 3/1977 | Japan | 525/121 |
| 52-72746 | 6/1977 | Japan | 525/121 |
| 62-235347 | 10/1987 | Japan | 525/121 |
| 1093623 | 12/1967 | United Kingdom | 525/121 |

OTHER PUBLICATIONS

Schonhorn et al. in *Journal Adhesion Science Technology*, vol. 3, No. 4, pp. 277–290 (1989).
Ramesh ad De in Journal of Materials Science, vol. 26, pp. 2846–2850 (1991).

*Primary Examiner*—Robert E. Sellers
*Attorney, Agent, or Firm*—Shook, Hardy & Bacon

[57] ABSTRACT

An epoxy or trimethylene ether-direct grafted halogeneated vinyl polymer is prepared by the reaction of an epoxide such as a 5-ethyl, 5'-methyl-hydantoin/epichlorogydrin condensation product with a halogenated vinyl polymer such as polyvinylidene fluoride in the presence of a metal halide catalyst. The ether residue of the epoxide is grafted directly to the first carbon-chain carbon of the halogenated vinyl polymer. The graft polymer compositions are utilized as ultrafiltration and reverse osmosis membranes.

41 Claims, 2 Drawing Sheets

EPOXIDE-DIRECT GRAFTED HALOGENATED VINYL POLYMERS

BACKGROUND OF THE INVENTION

The invention relates generally to polymers and, more particularly, to a method for reacting halogenated vinyl polymers with epoxides and to polymer products resulting from such reaction.

Halogenated vinyl polymers exhibit thermoplastic properties and are used in a wide variety of applications including as membranes, packaging films, coatings, electrical cable insulation coatings, sheets, pipes, composites, sealants, and adhesives impact modifiers. Such polymers are also used as sensor material in pressure and temperature monitoring applications.

Many of the above applications require enhancement of the durability of the halogenated vinyl polymers. The durability of such polymers may be chemically increased by using curing agents such as amines and peroxides with an acid acceptor, e.g. benzoyl peroxide, magnesium oxide. Radiation processes have also been utilized to cure polymers of the type described.

Surface modifications of halogenated vinyl polymers have also been effected to achieve the desired surface properties such as hydrophilicity for enhanced membrane process flux or improved wettability for better adhesive binding. For example, Schonhorn et al., in *Journal Adhesion Science Technology*, Vol. 3, No. 4, pages 277–290 (1989), disclose the grafting of epoxides onto polyvinylidene fluoride (PVDF) through the use of amine and amide coupling agents to produce a strong adhesive bond bridging the epoxy resin and PVDF. The amine/amide curing agent reacts with PVDF to modify the surface region and then cross-links the epoxy resin to the fluoropolymer through a diamine functionality than was previously bonded to backbonds of the fluoropolymer.

Epoxy resins are known to be reactive with aliphatic and aromatic acids and polyorganic acids, organic acid anhydrides and polyanhydrides, sulfones, polysulfones and the like. Lee et al., *Handbook of Epoxy Resins*, McGraw-Hill (1967).

Epoxy resins have been blended with PVDF, such as disclosed in U.S. Pat. No. 3,784,506, to achieve better corrosion resistance. The resulting mixture, however, is a blend of the epoxy resin and PVDF and no reaction occurs between the epoxy resin and PVDF.

Ramesh and De in *Journal of Materials Science*, Vol. 26, pages 2846–2850 (1991) have reported that melt-mixed blends of poly(vinyl chloride) and epoxidized natural rubber become cross-linked at elevated temperatures in the absence of any cross-linking agent. The products are described as having good oil resistance, high abrasion resistance, low resilience, and high modulus with moderate tensile and tear strength. Temperatures in excess of 140° C. are required to cause cross-linking of the poly(vinyl chloride) and epoxidized natural rubber.

SUMMARY OF THE INVENTION

It is a primary object of this invention to provide an epoxide modified halogenated vinyl polymer which can be formed by direct catalytic reaction of epoxides and halogenated vinyl polymers at room temperature conditions and ambient pressure so that improved properties may be imparted to the polymer product without having to utilize radiation processes or coupling agents as is conventionally required.

It is also an object of this invention to provide an epoxy modified halogenated vinyl polymer which has superior physical properties in comparison to the halogenated vinyl polymer reactant so that improved, including more durable, products can be formed from the modified polymer.

It is another object of this invention to provide an epoxy modified halogenated vinyl polymer which can be produced at room temperature conditions so that added heat is not required in the reaction process.

It is a further object of this invention to provide a method for producing an epoxy modified halogenated vinyl polymer which has only minimal cross-linking so that the polymer can be subsequently solubilized for processing to form membranes and other products having superior physical properties.

It is a still further object of this invention to provide a membrane material having improved properties, including a process flux which is greater than that typically achieved by conventional membranes such as those formed of polyether sulfone.

In one aspect, the invention is directed to epoxide modified halogenated vinyl polymers, such as made in accordance with the following reaction scheme:

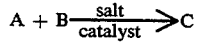

wherein A is an epoxide, B is a halogenated vinyl polymer, and C is the epoxide modified halogenated vinyl polymer. The epoxide halogenated vinyl polymers include epoxy-direct grafted halogenated vinyl polymers and halogenated vinyl trimethylene ether polymers. The term polymer as used herein may include homopolymers and copolymers.

The invention also encompasses a method of contacting an epoxide, such as an epoxy resin, with a halogenated vinyl polymer under conditions sufficient to prepare a reaction product, notably the epoxy-direct grafted halogenated vinyl polymers and/or the halogenated vinyl trimethylene ether polymers. The method includes the step of contacting the epoxide with the halogenated vinyl polymer in the presence of a catalyst, preferably an added catalyst. Notably, the method can be carried out at room temperature and ambient pressure. The reaction is preferably controlled to minimize the formation of cross-linked product so that the modified polymer can be readily solubilized ant further processed to form the desired product.

BRIEF DESCRIPTION OF THE DRAWINGS

In the accompanying drawings which form a part of the specification and are to read in conjunction therewith.

DETAILED DESCRIPTION OF THE INVENTION

Figure 1:
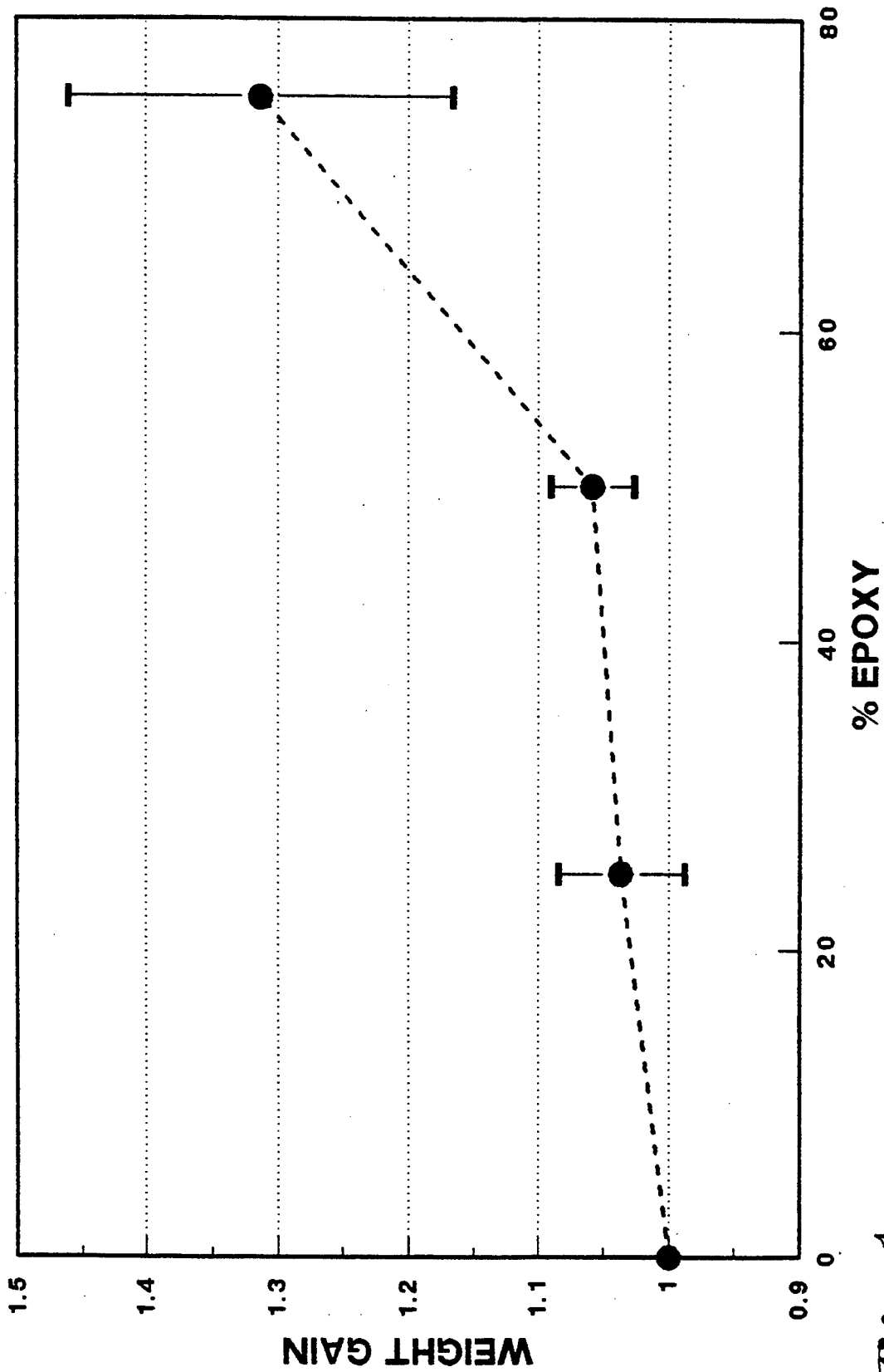
FIG. 1 is a graph showing the amount of weight gain for samples of PVDF-based membranes following heating in solutions containing various concentrations of 5-ethyl,5'-methyl-hydantoin and water, the weight gain being plotted on the y-axis and the concentration of 5-ethyl,5'-methyl-hydantoin being plotted on the x-axis.

Novel polymeric compositions are prepared by contacting a halogenated vinyl polymer with an epoxide under conditions sufficient to form such compositions, preferably by direct catalytic reaction of the halogenated vinyl polymer with the epoxide in accordance with the following reaction scheme:

$$A + B \xrightarrow[\text{catalyst}]{\text{salt}} C$$

wherein A is an epoxide, B is a halogenated vinyl polymer, and C is the epoxide modified halogenated vinyl polymer.

The halogenated vinyl polymers used in the present invention are of the formula (I):

$$\left[\begin{array}{cc} Y & X \\ | & | \\ -C-C- \\ | & | \\ H & Y \end{array}\right]_n$$

wherein
X is —F, —Cl, —Br, or —I;
Y is X, —CH$_3$, or —H; and
n is an integer, desirably an integer within the range of 50 to 5,000, preferably within the range of 500 to 3,000 and most preferably within the range of 600 to 1,200.

Representative examples of suitable halogenated vinyl polymers include polyvinylidene fluoride (PVDF), polyvinylidene chloride, polyvinyl chloride, copolymers of PVDF, halogenated polyethylene, halogenated polypropylene and the like. Particularly suited are PVDF, polyvinylidene chloride, polyvinyl chloride and copolymers of PVDF, with PVDF being the preferred halogenated vinyl polymer used in forming the polymeric compositions of the present invention. Halogenated vinyl polymers are readily commercially available, such as under the trademarks Kynar 461, Kynar SL, Kynar 2801 from Atochem, and Saran from Dow Chemical Co.

As used herein, the term epoxide refers to an organic compound containing a monofunctional epoxy group and includes the class of compounds known as epoxy resins. The epoxides used in the present invention are of the formula (II):

$$A—E_x$$

wherein
E is $$-CH_2-\underset{O}{\triangle}$$

and
A is selected from the group comprising:

(bisphenol A)

(bisphenol B)

(bisphenol F)

(5-ethyl,5'-methyl-hydantoin)

(isocyanurate)

(p-aminophenol)

(tetrakis(4-hydroxyphenyl)-ethane)

(furfuryl ether)

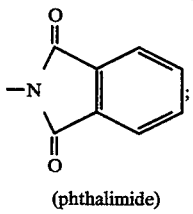

(phthalimide)

wherein
X is as previously defined;
x is an integer between 1 and 10;
q is an integer between 1 and 30; and
z is an integer between 1 and 20.

Representative examples of suitable epoxides include multi-functional epoxy resins such as condensation products of bisphenol A or bisphenol F with epichlorohydrin; condensation products of hydantoin with epichlorohydrin such as XU AY 238 sold by Ciba-Geigy Plastic Division and its homopolymerized or amine copolymerized resin from XU AY 238, and the like, and having an equivalent gram epoxy weight within the range of approximately 260 to 15,000; and monofunctional epoxides such as 1, 2-epoxy-7-octane, 2, 3-epoxypropyl furfuryl ether, and the like, available from Aldrich Chemicals Co. Condensation products of epichlorohydrin and bisphenol A, bisphenol B, and 5-ethyl,5'-methyl-hydantoin are particularly suited for use in producing the novel polymeric compositions of the present invention, especially when reacted with PVDF. The condensation products of epichlorohydrin and 5-ethyl,5'-methyl-hydantoin are the preferred epoxides.

The catalyst used in the present invention may include various suitable inorganic salts such as those of Group IA and IIA metals. Examples of generally preferred salts include lithium chloride, lithium iodide, lithium fluoride, calcium chloride, magnesium chloride, sodium fluoride and the like. The catalyst is preferably an added catalyst.

The polymeric compositions formed by reaction of the epoxide with the halogenated vinyl polymer comprise epoxide modified halogenated vinyl polymers, which include epoxy-direct grafted halogenated vinyl polymers and/or halogenated vinyl trimethylene ether polymers. The epoxy-direct grafted halogenated vinyl polymers include terminal epoxy-direct grafted halogenated vinyl polymers.

The terms "epoxy-direct grafted halogenated vinyl polymers" and "halogenated vinyl trimethylene ether polymers" include compounds which are believed to be of, but are not necessarily bound by, the formula (III):

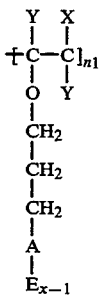

wherein
A, E, X, Y and x are as previously described; and $n_1$ is an integer, preferably between 1 and 5,000

Particularly preferred are polymers of formula III wherein X is —F or —Cl and E is bisphenol A, bisphenol B or 5-ethyl, 5'-methylhydantoin. Most preferable are polymers of formula III wherein X is —F and E is 5-ethyl, 5'-methyl-hydantoin.

The invention also includes a novel polymeric reaction product which is believed to be of the formula:

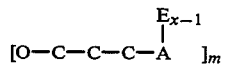

wherein
A, E and x are as previously described; and
m is an integer, desirably an integer within the range of 1 to 10,000, preferably within the range of 5 to 1,000, and most preferably within the range of 10 to 30.

A model reaction scheme in accordance with the present invention is believed to be as follows:

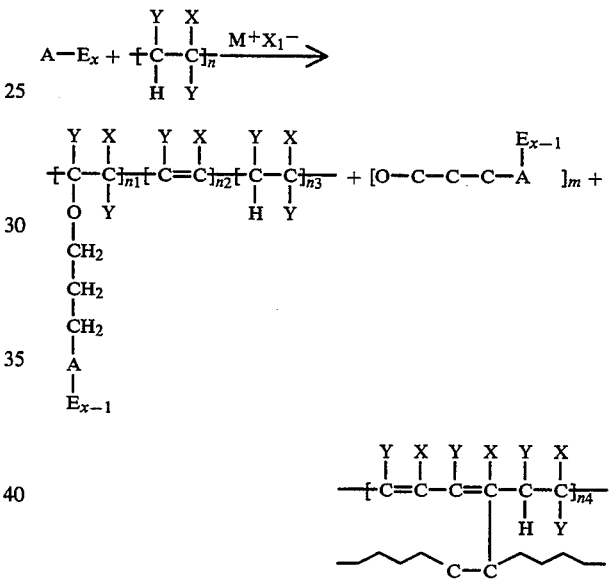

wherein
X, Y, A, E, m, $n_1$, n, and x are as previously described; and
$n_2$, $n_3$, and $n_4$ are integers, with the proviso that the sum of $n_1$, $n_2$, and $n_3$ is approximately equal to n, and with the further proviso that $n_4$ is approximately equal to the sum of $n_1$, $n_2$, and $n_3$.

The present invention also encompasses the method of preparing the novel polymeric compositions described above by reaction of the halogenated vinyl polymers with the epoxides. The reaction occurs in the presence of the catalyst, preferably an added catalyst. An organic solvent is preferably used to dissolve the salt catalyst and a supersaturated salt solution is generally preferred.

A solvent is also used to initially solubilize the reactants. The solvent chosen should be compatible with and should not react with the halogenated vinyl polymer or the epoxide. Suitable solvents include N,N-dimethylacetamide (DMAC), N-methylpyrrolidone (NMP) and the like.

Advantageously, the reaction conditions can, and preferably do, include room temperature and ambient pressure. A cold water bath may be required under certain reaction conditions to maintain the reaction temperature at the desired level.

The method of the present invention comprises the step of contacting the halogenated vinyl polymer with the epoxide in the presence of the catalyst. The method also includes the steps of solubilizing the catalyst and reactants in the solvent. A preferred method comprises the steps of dissolving the inorganic salt in the solvent, adding the halogenated vinyl polymer to the solvent and vigorously stirring the mixture to dissolve the polymer, then adding the epoxide and stirring or shaking until a homogeneous mixture is formed. The resulting mixture is allowed to stand until a color change occurs and, optionally, until solidification or gelation of the mixture occurs. It is believed that the color change signifies that the reaction has occurred to produce an epoxide modified halogenated vinyl polymer reaction product, notably the epoxy-direct grafted halogenated vinyl polymers and halogenated vinyl trimethylene ether copolymers. Solidification or gelation of the product signifies that cross-linking has occurred. The resulting mixture may be subjected to otherwise conventional processing before and/or after solidification to achieve the characteristics required for particular applications. Heating of the gelled reaction product typically produces a hard solid.

Generally, it is highly desirable to solubilize and further process the reaction product before it has solidified so that techniques other than moulding can be utilized to form the ultimate product from the polymer. In order to obtain a reaction product which can be solubilized, it is important that the amount of cross-linking which occurs during the reaction is maintained at a minimum since the cross-linked product cannot be readily solubilized. The method in accordance with the present invention thus includes the step of controlling the reaction to minimize the cross-linking of the reaction product.

A number of variables can be regulated to facilitate control over the type of reaction product produced. Cross-linking can be minimized by controlling the reaction temperature so that it remains below 130° C., and preferably below 90° C. The epoxide functionalities available for contacting the halogenated vinyl polymer should also be controlled to minimize the number of excess epoxide bonding sites which are available during the reaction to cause cross-linking of the polymer. Control of epoxide functionalities can be achieved in various suitable methods such as by contacting the epoxide with an amine or other reactive component in an amount sufficient to block a portion of the available epoxide functionalities. In addition, the amount of added catalyst should be controlled to prevent cross-linking.

It has also been determined that the amount of solvent used to solubilize the reactants has a significant effect on the reaction rate, i.e. as the amount of solvent increases, then the reaction rate decreases. In order to slow the rate of reaction so that cross-linking of the reaction product can be controlled, it is thus desirable to provide the solvent in an amount of between 0.1 and 95% by weight of the total composition, and preferably between 60 and 85% by weight of the total composition. Any cross-linked product which forms during the reaction process can be removed during further processing by filtration or other suitable methods.

A typical composition range for the ingredients used in the methods of the present invention is:

| | |
|---|---|
| halogenated vinyl polymer | 5 to 40 parts by wt. |
| epoxide | 0.1 to 100 parts by wt. |
| solvent | 0.1 to 100 parts by wt. |
| catalyst | 0.1 to 10 parts by wt. |

The polymeric compositions of the present invention have utility, including as ultrafiltration and reverse osmosis membranes, electrical insulation on wires and cables, tank coatings, automobile coatings, sensor materials, and other applications where a tough, flexible protective coating is desired. Notably, such polymeric compositions can exhibit greater durability, corrosion resistance and solvent resistance than either the halogenated vinyl polymer or epoxy resin reactants, greater flexibility than the epoxy resin, and hydrophilicity.

As an example, the novel polymeric compositions may be processed in an otherwise conventional manner to form ultra filtration membranes which exhibit superior flux, i.e. up to or greater than 95 gallons/ft$^2$/day (GFD), and rejection of solids up to or exceeding 99.2%. The membrane is formed by subjecting the reaction product, prior to gelation, to membrane casting, following by a leaching process after gelation.

The following examples, in which all parts are by weight, are illustrative of the present invention and are not intended to limit the scope of the invention:

EXAMPLE 1

At room temperature and ambient pressure, 0.6 parts lithium chloride were first dissolved in 24.4 parts N,N-dimethylacetamide (DMAC), then 3.8 parts of polyvinylidene fluoride polymer (Atochem Kynar 461) were added and dissolved by vigorous stirring using a blender or mechanical shaking. 1.5 parts of the condensation products of epichlorohydrin and 5-ethyl,5'-methylhydantoin (Ciba-Geigy Aracast XU AY 238) were then added, followed by additional stirring until a homogeneous mixture was obtained. A dark purple dried gel formed overnight, indicating that a reaction product had formed.

EXAMPLE 2

At room temperature and ambient pressure, 0.6 parts lithium chloride were first dissolved in 24.4 parts N,N-dimethylacetamide (DMAC), then 3.8 parts of polyvinylidene fluoride polymer (Atochem Kynar 461) were added and dissolved by vigorous stirring using a blender or mechanical shaking. 1.5 parts of the condensation products of epichlorohydrin and bisphenol A (Ciba-Geigy Araldite GY 508) were then added, followed by additional stirring until a homogeneous mixture was obtained. A dark purple solution formed after 3 hours at room temperature and gelled after sitting overnight, indicating that a reaction product had formed.

EXAMPLE 3

At room temperature and ambient pressure, 0.6 parts lithium chloride were first dissolved in 24.4 parts N,N-dimethylacetamide (DMAC), then 3.8 parts of polyvinylidene fluoride polymer (Atochem Kynar 461) were added and dissolved by vigorous stirring using a blender or mechanical shaking. 0.6 parts of the condensation products of epichlorohydrin and bisphenol A (Ciba-Geigy Araldite GY6010) were then added, followed by additional stirring until a homogeneous mixture was obtained. A dark purple solution formed immediately at room temperature, and a dried solid gel formed after sitting at room temperature overnight, indicating that a reaction product had formed.

EXAMPLE 4

At room temperature and ambient pressure, 0.6 parts lithium chloride were first dissolved in 24.4 parts N-methylpyrrolidone (NMP), then 3.8 parts of polyvinylidene fluoride polymer (Atochem Kynar 461) were added and dissolved by vigorous stirring using a blender or mechanical shaking. 1.5 parts of the condensation products of epichlorohydrin and 5-ethyl,5'-methylhydantoin (Ciba-Geigy Aracast XU AY 238) were then added, followed by additional stirring until a homogeneous mixture was obtained. A dark purple dried gel formed overnight at room temperature, indicating that a reaction product had formed.

EXAMPLE 5

At room temperature and ambient pressure, 0.6 parts calcium chloride were first dissolved in 24.4 parts N,N-dimethylacetamide (DMAC), then 3.8 parts of polyvinylidene fluoride polymer (Atochem Kynar 461) were added and dissolved by vigorous stirring using a blender or mechanical shaking. 1.5 parts of the condensation products of epichlorohydrin and 5-ethyl,5'-methylhydantoin (Ciba-Geigy Aracast XU AY 238) were then added, followed by additional stirring until a homogeneous mixture was obtained. A dark purple dried gel formed overnight at room temperature, indicating that a reaction product had formed.

EXAMPLE 6

At room temperature and ambient pressure, 0.6 parts lithium bromide were first dissolved in 24.4 parts N,N-dimethylacetamide (DMAC), then 3.8 parts of a hexafluoropropylene and vinylidene fluoride copolymer (Atochem Kynar SL) were added and dissolved by vigorous stirring using a blender or mechanical shaking. 1.5 parts of the condensation products of epichlorchydrin and bisphenol A (Ciba-Geigy Araldite GY6010) were then added, followed by additional stirring until a homogeneous mixture was obtained. A reddish brown dried gel formed over a weekend at room temperature, indicating that a reaction product had formed.

EXAMPLE 7

At room temperature and ambient pressure, 0.6 parts calcium chloride are first dissolved in 24.4 parts N,N-dimethylacetamide (DMAC), then 3.8 parts of polyvinylidene fluoride polymer (Atochem Kynar 461) are added and dissolved by vigorous stirring using a blender or mechanical shaking. 1.5 parts of the condensation products of epichlorohydrin and 5-ethyl,5'-methylhydantoin (Ciba-Geigy Aracast XU AY 238) are added, followed by additional stirring until a homogeneous mixture is obtained. Formation of a dark purple dried gel overnight at room temperature indicates that a reaction product has formed.

EXAMPLE 8

An epoxide was prepared by mixing together 100 gm 5-ethyl,5'-methyl-hydantoin (Ciba-Geigy Aracast XU AY 238), 12.1 gm ethylamine, 74 gm dibenzylamine, and 2 gm boron trifluoride methanol complex in a container. The temperature of the mixture was observed to increase from 32° C. to 115° C. over a period of 30 minutes. The solution viscosity was observed to increase. The resin product was cooled to room temperature to form a hardened product which was insoluble in water but soluble in N,N-dimethylacetamide (DMAC).

EXAMPLE 9

The resin product from Example 8 was mixed in an amount of 6.7 parts by weight with 22 parts by weight of polyvinylidene fluoride (Solof XP-12N) and 5 parts by weight lithium chloride and dissolved in 66.3 parts by weight of N,N-dimethylacetamide (DMAC) to obtain a solution having a viscosity of 91.5 poise. The solution was then cast over a 5 mil polyester nonwoven porous substrate sheet using a 15 mils doctor's blade at a constant speed of 10 cm per second at 70° C. The cast solution was then gelled in a bath containing 2% magnesium sulfate water solution at room temperature for one minute and then was leached in a bath of water overnight to form a membrane. The membrane had a thickness of 12 mils and when tested to concentrate a milk product containing 18.8% solids, it demonstrated a flux of 95 gallons/ft$^2$/day (GFD) and 99.2% rejection of the milk solids when the flat cell testing unit was operated at a flow rate of 1.5 gpm at 40 psig and 54° C.

The membrane of Example 9 thus demonstrated for greater flux than conventional polyether sulfone membranes which typically operate at only 20 GFD. The membrane of the present invention also demonstrated a rejection only slightly less than the 99.7% rejection typically achieved with conventional polyether sulfone membranes.

EXAMPLE 10

Figure 2:
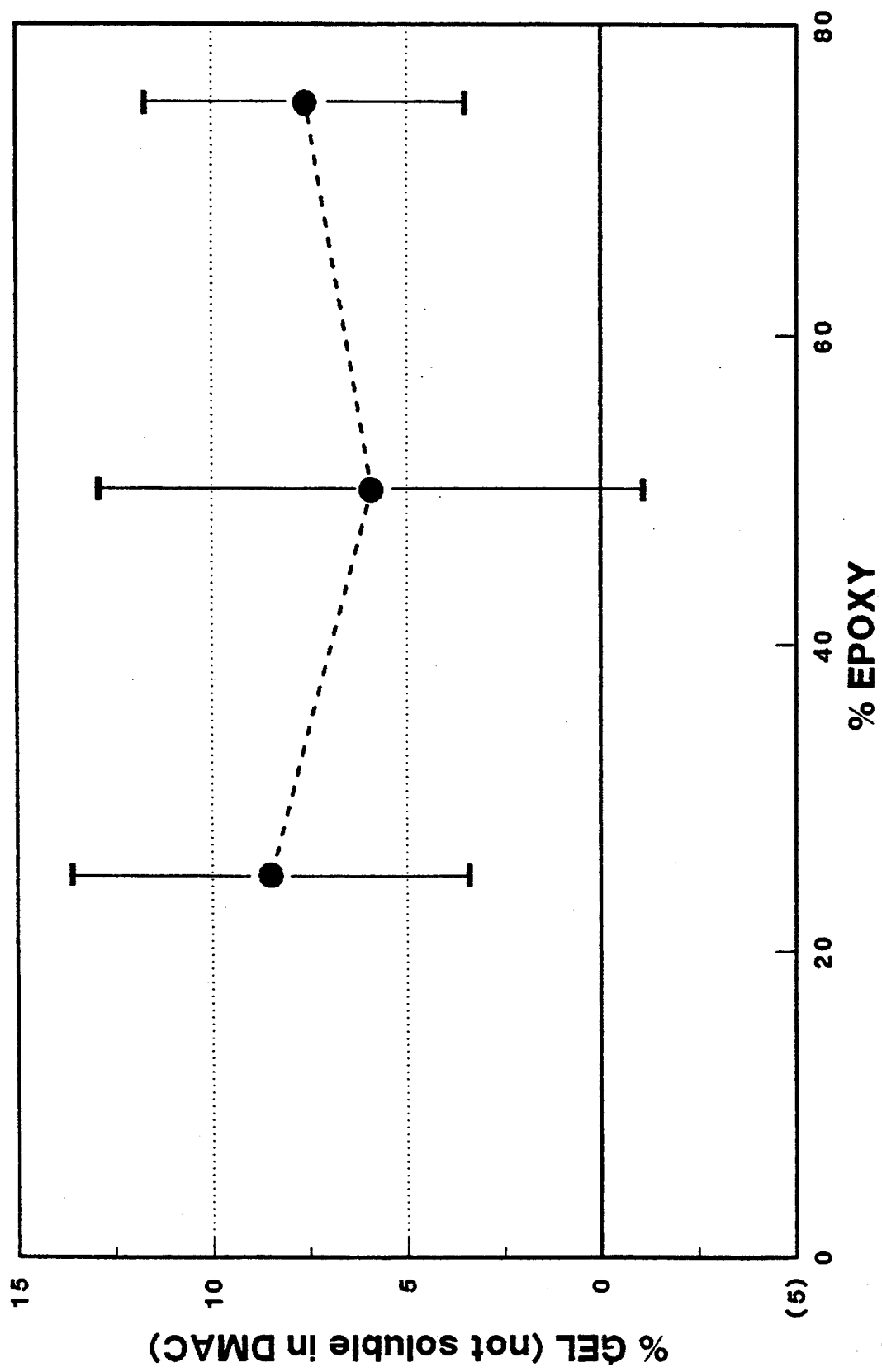
FIG. 2 is a graph showing the amount of insoluble gel recovered from the membranes of FIG. 1 as a function cf the concentration of 5-ethyl,5'-methyl-hydantoin, the amount of insoluble gel being plotted on the y-axis and the concentration of 5-ethyl,5'-methyl-hydantoin being plotted on the x-axis.

Squares (3"×3") of Koch Membrane System HFM-ZLSC PVDF-based membranes (without backing support) were dried and weighed. Five to eight membrane squares each were immersed in solutions containing 10% lithium chloride and 90% water for 2 hours at ambient temperatures and then moved to solutions containing (1) 25% 5-ethyl,5'-methyl-hydantoin (Ciba-Geigy Aracast XU AY2381 and 75% water; (2) 50% 5-ethyl,5'-methyl-hydantoin (Ciba-Geigy Aracast XU AY238) and 50% water; and (3) 75% 5-ethyl,5'-methyl-hydantoin (Ciba-Geigy Aracast XU AY238) and 25% water. The membranes were heated at 50° C. for 24 hours. The membranes were observed to turn to a brownish color. The membranes were then taken out of the solutions, rinsed with reverse osmosis water for 1 hour, then they were dried and weighed. The weight gain after this treatment was plotted against the percent 5-ethyl,5'-methyl-hydantoin epoxide in FIG. 1, which shows more than 30% weight gain was achieved in the 75% ethyl, 5'-methyl-hydantoin solution. The membranes were then immersed in individual 100% DMAC solvent tubes for two days. Then each solution was filtered to determine the amount of insoluble gel. The gel was dried and weighed. FIG. 2 shows the effect of percent 5-ethyl,5'-methyl-hydantoin/water treatment as a function of insoluble gel obtained. About 6-8% gel recovered and this strongly indicates that reaction between PVDF (HFM-180) and 5-ethyl,5'-methyl-hydantoin occurred. In addition, the reaction product is not soluble in the solvent that dissolved PVDF, or 5-ethyl,5'-methyl-hydantoin individually.

Since many possible embodiments may be made of the invention without departing from the scope thereof, it is to be understood that all matter herein set forth is to be interpreted as illustrative and not in a limiting sense.

Having thus described the invention, what is claimed is:

1. A polymer comprising an epoxy-direct grafted halogenated vinyl polymer, in which an ether moiety of an epoxy-direct grafted group is bonded directly to a first carbon-chain carbon of a halogenated vinyl polymer, said first carbon adjacent a second carbon-chain carbon of the halogenated vinyl polymer, said second carbon having bonded directly thereto generally two moieties selected from the group consisting of fluoro, chloro, bromo, iodo, methyl and hydro, provided that said second carbon has bonded directly thereby at least one fluoro, chloro, bromo or iodo moiety.

2. The polymer of claim 1, wherein said epoxy-direct grafted halogenated vinyl polymer comprises a terminal epoxy-direct grafted halogenated vinyl polymer.

3. A polymer comprising a halogenated vinyl trimethylene ether copolymer, in which an ether moiety of a trimethylene containing group is bonded directly to a first carbon-chain carbon of a halogenated vinyl polymer, said first carbon adjacent a second carbon-chain carbon of the halogenated vinyl polymer said second carbon having bonded directly thereto generally two moieties selected from the group consisting of fluoro, chloro, bromo, iodo, methyl and hydro, provided that said second carbon has bonded directly thereto at least one fluoro, chloro, bromo or iodo moiety.

4. A polymer comprising a fluorinated vinyl trimethylene ether copolymer, in which an ether moiety of a trimethylene containing group is bonded directly to a first carbon-chain carbon of a fluorinated vinyl polymer, said first carbon adjacent a second carbon-chain carbon of the fluorinated vinyl polymer, said second carbon having bonded directly thereto generally two moieties selected from the group consisting of fluoro, chloro, bromo, iodo, methyl and hydro, provided that said second carbon has bonded directly thereto at least one fluoro moiety.

5. A polymer of the general formula:

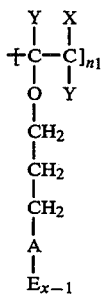

wherein
E is

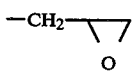

and
A is selected from the group consisting of:

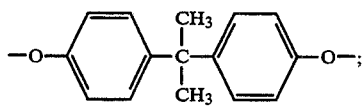

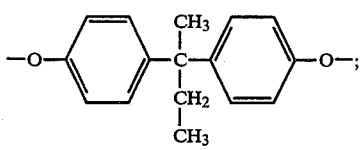

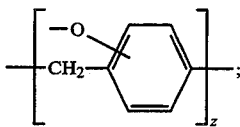

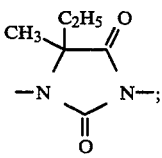

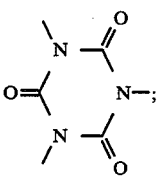

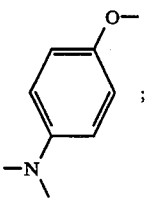

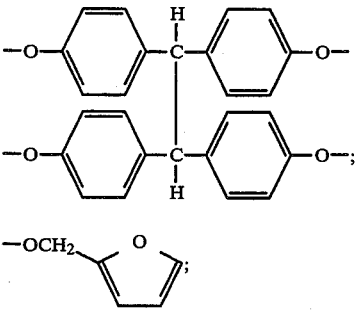

wherein
X is —F, —Cl, —Br, or —I;
Y is X, —CX$_3$, or —H;
n$_1$ is an integer between 1 and 5,000;
x is an integer between 1 and 10;
q is an integer between 1 and 30; and
z is an integer between 1 and 20; provided that when the value of x is less than the number of —O and N— moieties for a given A group, the —O or N— moieties not bonded to E are OH or NH groups, respectively.

6. A polymer comprising an epoxide modified fluorinated vinyl polymer, wherein said epoxide modified fluorinated vinyl polymer comprises an epoxy-direct grafted fluorinated vinyl polymer, in which an ether moiety of an epoxy-direct grafted group is bonded directly to a first carbon-chain carbon of a fluorinated vinyl polymer, said first carbon adjacent a second carbon-chain carbon of the fluorinated vinyl polymer, said second carbon having bonded directly thereto generally two moieties selected from the group consisting of fluoro, chloro, bromo, iodo, methyl and hydro, provided that said second carbon had bonded directly thereto at least one fluoro moiety.

7. The polymer of claim 6, wherein said second carbon has bonded directly thereto two fluoro moieties.

8. The polymer of claim 6, wherein said epoxy-direct grafted fluorinated vinyl polymer comprises a terminal epoxide epoxy-direct grafted fluorinated vinyl polymer.

9. A polymer having a formula:

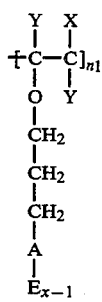

wherein
E is

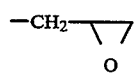

and
A is

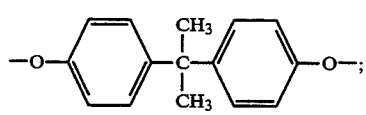

and wherein
X is —F, —Cl, —Br, or —I;
Y is X, —CX$_3$, or —H;
n$_1$ is an integer between 1 and 5,000; and
x is an integer between 1 and 10; provided that when X is 1, A is

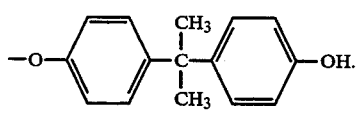

10. The polymer of claim 9, wherein X is —F or —Cl.

11. The polymer of claim 9, wherein X is —F.

12. A polymer having a formula:

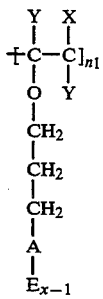

wherein
E is

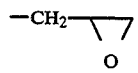

and
A is

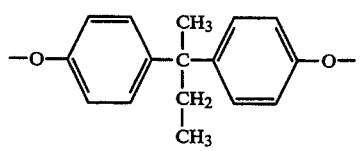

and wherein
X is —F, —Cl, —Br, or —I;
Y is X, —CX$_3$, or —H;
n$_1$ is an integer between 1 and 5,000; and
x is an integer between 1 and 10.

13. The polymer of claim 12, wherein X is —F or —Cl.

14. The polymer of claim 12, wherein X is —F; provided that when x is 1, A is

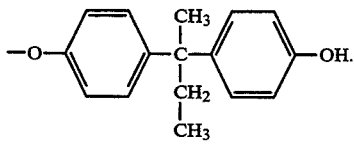

15. A polymer having a formula:

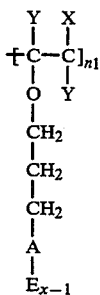

wherein
E is

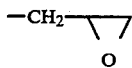

and
A is

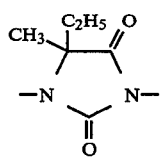

and wherein
X is —F, —Cl, —Br, or —I;
Y is X, —CX$_3$, or —H;
n$_1$ is an integer between 1 and 5,000; and
x is an integer between 1 and 10; provided that when x is 1, A is

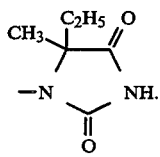

16. The polymer of claim 15, wherein X is —F or —Cl.

17. The polymer of claim 15, wherein X is —F.

18. A method of making an epoxide modified halogenated vinyl polymer reaction product comprising contacting an epoxide with a halogenated vinyl polymer in the presence of a catalyst of an inorganic salt of at least one Group IA or IIA metal.

19. The method of claim 18, wherein said epoxide is a condensation product of bisphenol A and epichlorohydrin.

20. The method of claim 19, wherein said halogenated vinyl polymer is selected from the group consisting of polyvinylidene fluoride, polyvinylidene chloride, polyvinyl chloride and copolymers of polyvinylidene fluoride.

21. The method of claim 19, wherein said halogenated vinyl polymer is polyvinylidene fluoride.

22. The method of claim 18, wherein said epoxide is a condensation product of bisphenol F and epichlorohydrin.

23. The method of claim 22, wherein said halogenated vinyl polymer is selected from the group consisting of polyvinylidene fluoride, polyvinylidene chloride, polyvinyl chloride and copolymers of polyvinylidene fluoride.

24. The method of claim 22, wherein said halogenated vinyl polymer is polyvinylidene fluoride.

25. The method of claim 18, wherein said epoxide is a condensation product of 5-ethyl,5'-methyl-hydantoin with epichlorohydrin.

26. The method of claim 25, wherein said halogenated vinyl polymer is selected from the group consisting of polyvinylidene fluoride, polyvinylidene chloride, polyvinyl chloride and copolymers of polyvinylidene fluoride.

27. The method of claim 25, wherein said halogenated vinyl polymer is polyvinylidene fluoride.

28. The method of claim 18, wherein said halogenated vinyl polymer is selected from the group consisting of polyvinylidene fluoride, polyvinylidene chloride, polyvinyl chloride, copolymers of polyvinylidene fluoride, halogenated polyethylene, and halogenated polypropylene having an equivalent gram epoxy weight of between approximately 260 and 15,000.

29. The method of claim 18, wherein said halogenated vinyl polymer is a copolymer of hexafluoropropylene and vinylidene fluoride.

30. The method of claim 18, wherein said epoxide is present in an amount within the range of approximately 0.1 to 100 parts by weight and said halogenated vinyl polymer is present in an amount within the range of approximately 5 to 40 parts by weight.

31. The method of claim 18, wherein said catalyst is solubilized in an organic solvent, then the halogenated vinyl polymer is added to thereto and dissolved therein, and then the epoxide is added thereto and a homogeneous mixture is formed, a color change thereto occurring thereafter.

32. The method of claim 31, wherein said inorganic salt catalyst is selected from the group consisting of lithium chloride, lithium iodide, lithium fluoride, calcium chloride, magnesium chloride, and sodium fluoride.

33. The method of claim 31, wherein said inorganic salt catalyst is a fluoride, chloride, bromide or iodide of a Group IA metal.

34. The method of claim 18, wherein said catalyst is an added catalyst.

35. The polymer of claim 1, which can be solubilized.

36. The polymer of claim 6, which can be solubilized.

37. The polymer of claim 7, wherein the epoxy-direct grafted group is a residue of a condensation product of 5-ethyl, 5'-methyl-hydantoin with an epoxy.

38. The polymer of claim 36, wherein the epoxy is epichlorohydrin.

39. The method of claim 31, wherein the halogenated vinyl polymer is present in an amount from 5 to 40 parts by weight (pbw), the epoxide is present in an amount from 0.1 to 100 pbw, the organic solvent is present in an amount from 0.1 to 100 pbw, and the inorganic salt catalyst is present in an amount from 0.1 to 10 pbw.

40. The method of claim 39, which is conducted at ambient pressure and at a temperature below 130 degrees C.

41. The method of claim 40, which is conducted at a temperature below 90 degrees C. Z

* * * * *

UNITED STATES PATENT AND TRADEMARK OFFICE
CERTIFICATE OF CORRECTION

PATENT NO. : 5,350,805
DATED : September 27, 1994
INVENTOR(S) : Juchui R. Lin

It is certified that error appears in the above-indentified patent and that said Letters Patent is hereby corrected as shown below:

Column 11, line 12, the word "thereby" should be --thereto --.

Column 13, line 55, the capital "X" should be a lowercase "x".

Column 14, the period following the end of claim 12 should be a semicolon (;) and the following should be added thereafter: -- provided that when x is 1, A is

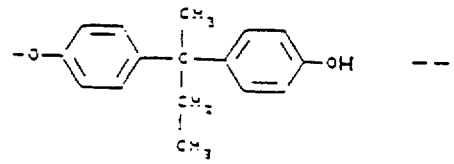 --

UNITED STATES PATENT AND TRADEMARK OFFICE
CERTIFICATE OF CORRECTION

PATENT NO. : 5,350,805
DATED : September 27, 1994
INVENTOR(S) : Juchui R. Lin

It is certified that error appears in the above-indentified patent and that said Letters Patent is hereby corrected as shown below:

Column 16, line 47, claim 38, the dependency from claim 36 should be from claim 37.

Column 16, line 59, the "Z" following the period should be deleted.
Column 14, line 41, claim 14, after "F" delete "; provided that when X is 1, A is" and replace with --.--.

Signed and Sealed this

Third Day of October, 1995

Attest:

BRUCE LEHMAN

*Attesting Officer*   *Commissioner of Patents and Trademarks*